ically connected operational amplifiers having differential inputs, each feeding one of the differential inputs of a third operational amplifier, two identical impedances connected in series between the inverting inputs of the first two operational amplifiers, a fourth operational amplifier connected as a voltage follower the input of which is connected to the node of the said two impedances and the output of which is connected through two pairs of series resistors to the corresponding non-inverting inputs of the two first mentioned operational amplifiers, the nodes of said pairs of series resistors being connected through further resistors to the output of the corresponding operational amplifiers, the input terminals of the pre-amplifier being formed by the said non-inverting inputs of the two first mentioned operational amplifiers and the output of the pre-amplifier being formed by the output of the third operational amplifier.

United States Patent
Natens et al.

[11] 3,722,274
[45] Mar. 27, 1973

[54] MAGNETIC FLOW METER
[75] Inventors: Luc Yves Natens, Berchem; Jean Martha De Gueldre, Edegem, both of Belgium
[73] Assignee: Agfa-Gevaert N.V., Mortsel, Belgium
[22] Filed: Apr. 13, 1971
[21] Appl. No.: 133,560

[30] Foreign Application Priority Data
  Apr. 14, 1970   Great Britain.....................17,752/70

[52] U.S. Cl. ..............................................73/194 EM
[51] Int. Cl..............................G01f 1/00, G01p 5/08
[58] Field of Search..................................73/194 EM

[56] References Cited
UNITED STATES PATENTS
3,433,066  3/1969  Bailey..............................73/194 EM
3,491,593  1/1970  Bailey..............................73/194 EM Primary Examiner—Charles A. Ruehl
Attorney—William J. Daniel

[57] ABSTRACT

A magnetic flow meter, the pre-amplifier of which comprises two identically connected operational amplifiers having differential inputs, each feeding one of the differential inputs of a third operational amplifier, two identical impedances connected in series between the inverting inputs of the first two operational amplifiers, a fourth operational amplifier connected as a voltage follower the input of which is connected to the node of the said two impedances and the output of which is connected through two pairs of series resistors to the corresponding non-inverting inputs of the two first mentioned operational amplifiers, the nodes of said pairs of series resistors being connected through further resistors to the output of the corresponding operational amplifiers, the input terminals of the pre-amplifier being formed by the said non-inverting inputs of the two first mentioned operational amplifiers and the output of the pre-amplifier being formed by the output of the third operational amplifier.

5 Claims, 5 Drawing Figures

MAGNETIC FLOW METER

The invention relates to a magnetic flow meter for measuring the flow rate of an electrically conductive liquid passing through a conduit, comprising means for generating an alternating magnetic flux normal to the flow direction of the liquid.

The principle of the magnetic flow meter is based on Lenz's law teaching that over a conductor moving in a magnetic field an E.M.F. is created which is directly proportional to the magnitude of the field, to the velocity of the movement and to the length of the conductor. When all parameters besides the velocity are kept to a constant value, then an unequivocal relation is obtained between the velocity and the generated voltage. The same reasoning also counts when the moving conductor is replaced by an electrolite which is in galvanic contact with a set of electrodes.

The relation is: $U_{xy} = S.B.L.v_g$,
wherein:
$U_{xy}$ = the generated voltage
$S$ = the sensitivity of the flow meter
$B$ = magnetic field,
$L$ = length of the conductor,
$v_g$ = the average flow velocity of the liquid. When the distribution of velocity is constant over the entire cross section of the liquid column, then $S = 1$.

From practice it is known that the sensitivity $S$ remains constant when the distribution of velocity in the conduit shows axial symmetry, which condition can nearly always be realized.

For avoiding disturbance by polarization phenomenons between the measuring electrodes, the magnetic field used is an A.C. field.

When $U_{xy}$ is measured and if no error voltages are present, i.e. voltages which are not directly proportional to the rate of flow, then $v_g$ can be determined.

It is known to use a flow meter with a so-called transverse field. Such a flow meter comprises a straight tube made from an insulating material with circular cross section. The measuring electrodes are formed by two platinum wires which extend through opposite sides of the wall of the tube with their extremities lying flush with the innerside of the tube and having a surface of about 1 sq.mm. The magnetic A.C. field can be generated by a coil, arranged round a magnetic core, the tube being located in an air gap of the said core.

The electrodes, the connection wires of the electrodes, and the electrolite between the electrodes form a closed loop, and thus a voltage is generated in this loop by the A.C. magnetic field. This voltage is given by:

$$U_{ind} = (\delta \phi)/(\delta t) \quad (1)$$

and since: $B = B_o \sin \omega t$
and $$\phi = \iint BdS = \iint_s B_o \sin t \, dS = \sin \omega t \iint_s B_o dS$$

and $$\iint B_o dS = \phi_o$$

then $$\phi = \phi_o \sin \omega t$$

Hence $$U_{ind} = -\phi_o \omega \cos \omega t = \phi_o \omega \sin\left(\omega t - \frac{\pi}{2}\right) \quad (2)$$

So, this voltage $U_{ind}$ is shifted 90° in phase in respect to the voltage $U_{xy}$ over the measuring electrodes, which voltage is directly proportional to B, so that these voltages can be separated very easily from each other by synchronous demodulation. In an other way it is possible to reject the induced voltage $U_{ind}$ by arranging the circuit of the liquid and the measuring leads so that:

$$\oint U_{ind} dl = 0 \quad (3)$$

The voltage over the measuring electrodes is amplified in a pre-amplifier. Since the flowing liquid to be measured may have an impedance between the two electrodes which can be represented by e.g. a resistor of about 500 kΩ, one may use a pre-amplifier having a very high input impedance and which is arranged as close as possible to the measuring electrodes.

Further desirable properties for the pre-amplifier include a good suppression of a signal in common mode and, moreover, an insensitivity for ambient disturbances, i.e. temperature, humidity, magnetic and electric fields.

Further, the bias current of the input stage of the amplifier must be taken in account so that a low impedance path for D.C. must be provided while for A.C. a high input impedance is needed, as well for the voltage in differential as in common mode operation.

By the term "common mode voltage" as used in the present application is meant the voltage of the liquid at the location of the measuring electrodes with respect to a reference voltage such as e.g. ground voltage. The conduit line through which the liquid to be measured passes is usually grounded at some point but the voltage at the location of the measuring electrodes may differ from ground voltage because of undesired magnetic, capacitive or galvanic coupling.

By the term "differential mode" is meant the voltage difference between the two measuring electrodes, which difference is actually proportional to the flow rate of the liquid.

The invention relates to a magnetic flow meter for measuring the rate of flow of a liquid flowing through a conduit, wherein a magnetic alternating flux is generated almost normal to the direction of flow of the liquid through the conduit, and a voltage is measured over two measurement electrodes which are located on an axis normal to the direction of the flux and to the direction of the flow liquid. The meter comprises an electronic circuit including a preamplifier having a high common mode rejection ratio and high input impedance, said preamplifier comprising two identically connected operational amplifiers having differential inputs, each feeding one of the differential inputs of a third operational amplifier, two identical impedances connected in series between the inverting inputs of the first two operational amplifiers, a fourth operational amplifier connected as a voltage follower with its input connected to the node of the two impedances and its output connected through two pairs of series resistors to the corresponding non-inverting inputs of the two first mentioned operational amplifiers, the nodes of said pairs of series resistors being connected through further resistors to the output of the corresponding operational amplifiers, the input terminals of the pre-amplifier being formed by the non-inverting inputs of the two first mentioned operational amplifiers and the output of the pre-amplifier being formed by the output of the third operational amplifier.

The invention will now be described hereinafter by way of example with reference to the accompanying drawings.

Figure 1:
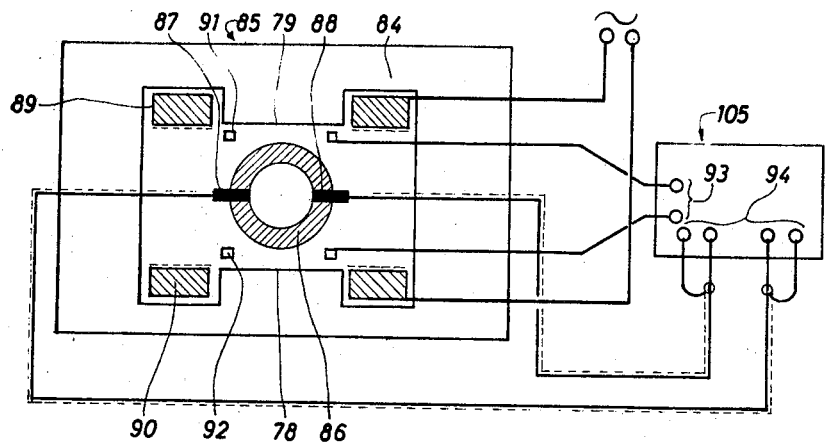
FIG. 1 shows diagrammatically a cross-section of a flow meter with a transverse magnetic field.

The magnetic flow meter represented in FIG. 1 is designed for measuring the flow rates of e.g. 100 ccs/min to 2 l/min and has an inside diameter of 6 mm so that a minimum flow speed of about 1 m/min is obtained. This speed represents a good compromise between, at one hand, undesirable low speeds wherein the parasitic effects are mainly of electronic nature, and, at the other hand, the high speeds wherein asymmetric flow and turbulence cause errors.

The magnetic flow meter 85 which is used together with the pre-amplifier according to the invention comprises a magnetic core 84 made of thin ferromagnetic laminations, insulated one from another and cemented together, so that the magnetic losses are kept as small as possible. The liquid to be measured flows through a tube 86 made from an insulating material which is dimensionally stable and corrosion resistant, such as e.g. Teflon (registered trade mark) or glass, and re-enforced at the inlet and the outlet by means of a stainless steel tube. To obtain a small pressure drop, the tube ends are conically finished.

In the tube 86 two measuring electrodes 87 and 88 are arranged opposite to one another in a direction normal to the direction of the magnetic alternating field which is produced by the two poleshoes 78 and 79 of the magnetic core 84. Round the poleshoes 78 and 79 two series connected coils 89 and 90 are arranged which are fed with a current in the order of magnitude of 1 to 4 A, at a tension of 220 V, 50 or 60 Hz. In the air gap between the poleshoes 78, 79 and the tube 86 two series connected measuring coils 91 and 92 are arranged for generating a reference signal which is directly proportional to the intensity of the magnetic field.

The wires connecting the electrodes are twisted together and are led outside the device via a small rigid metal tube. This tube serves as a lever for pivoting the set of electrodes and feed wires around the axis of the electrodes so that the condition $$\oint U_{ind} dl = 0 \text{ is complied with}$$

It is known to determine the amplitude and phase of the generated field from the current flowing through the coils. For this purpose, a current transformer is mostly used. This process however, gives rise to considerable error because of eddy currents in the copper as well as in the iron material of the core which leads to the creation of additional fields in the magnetic circuit so that the amplitude and phase of the current is no longer a measure for the generated field. These losses strongly depend on the temperature. Moreover, the eddy currents in the core iron may give rise to the generation of currents which are shifted in phase and which themselves may generate magnetic fields which are also shifted in phase.

Hence, according to a preferred feature of the present invention, the phase and the amplitude of the field are measured as close as possible to the area where the measuring electrodes are situated, i.e. as close as possible to the measuring tube. For this reason the measuring coils 91 and 92 are arranged on both poleshoes 78 and 79 of the magnetic core. Since the applied voltage therein is proportional to $-(d\Phi/dt)$ and $\phi \iint B dS$, the output signal must first be integrated to obtain a measure of the field, see formula (2) hereinbefore.

Figure 2:
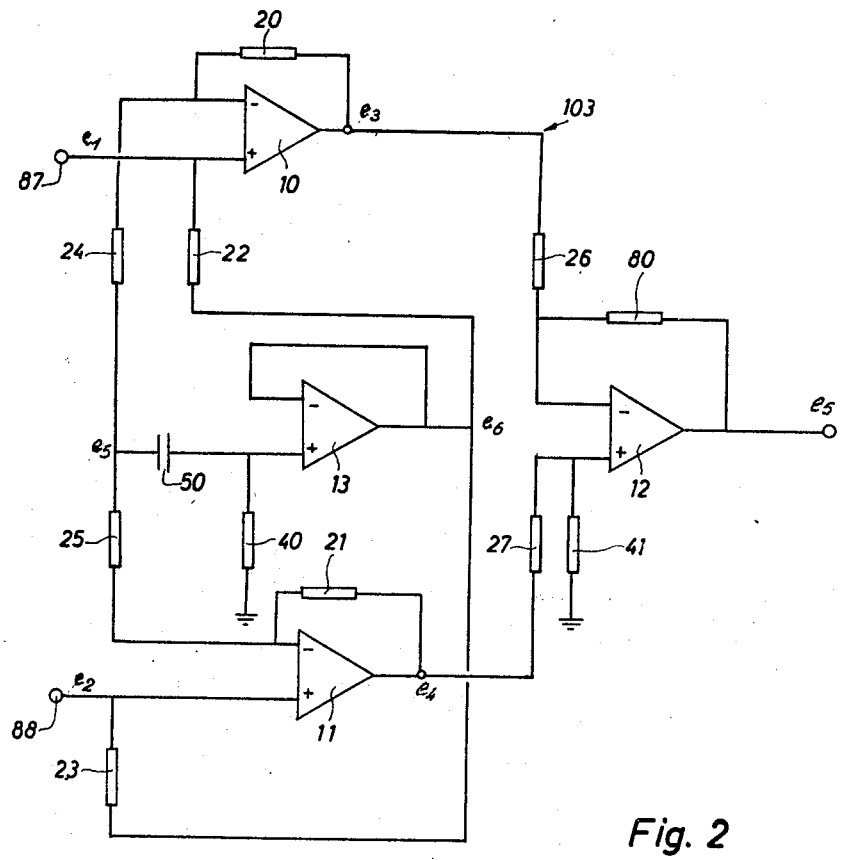
FIG. 2 shows a simplified illustration of the pre-amplifier according to the invention.

The pre-amplifier according to FIG. 2 comprises four operational amplifiers. The operational amplifiers 10 and 11 have differential inputs and are connected as feedback amplifiers, and they are each provided between their inverting input and their output with a feedback resistor 20 and 21, of equal resistance value. The non-inverting inputs of the amplifiers 10 and 11 are connected to the measuring electrodes 87 and 88. The outputs of the amplifiers 10 and 11 are connected to the differential inputs of a third feedback amplifier 12 through the resistors 26 and 27. The reference number 80 stands for the feedback resistor of the amplifier 12. A resistor 41 is connected between the non-inverting input of the amplifier 12 and the ground. Between the inverting inputs of the amplifiers 10 and 11 two equal resistors 24 and 25 are connected in series, while the node of the resistors 24 and 25 is connected over a capacitor 50 to the input of a fourth operational amplifier 13 which is connected as a voltage follower. The node of both identical resistors 24 and 25 lies at the common mode voltage. This common mode voltage is fed back by the voltage follower 13, which has a low output impedance, through the identical resistances 22 and 23 to the non-inverting inputs of the amplifiers 10 and 11. The non-inverting input of the voltage follower 13 is coupled to the ground through a resistor 40.

The operation of the amplifier according to FIG. 2 can be explained as follows. Since the amplifier is supposed to be linear, use may be made of the superposition method. The input voltage is composed of the common mode voltage and the differential voltage.

For the common mode voltage $e_1 = e_2$. In consequence thereof, both differential inputs of the amplifiers 10 and 11 are at equal voltage. So, there is no current flowing through either the resistors 24, 25 or through the resistors 20 and 21, so that: $e_1 = e_2 = e_3 = e_4 = e_5$. The common mode voltage is thus transmitted with an amplification factor 1.

For a differential voltage $\Delta e = e_1 - e_2$ a current $i = (\Delta e / 2 R_{24})$ flows through the resistors 24 and 25 and consequently also through the resistors 20 and 21, so that $$e_3 - e_4 = i(2R_{24} + R_{20} + R_{21});$$

and since $$R_{20} = R_{21}$$

then $e_3 - e_4 = i(2R_{24} + 2R_{20})$
or $e_3 - e_4 = (\Delta e/2R_{24})(2R_{24} + 2R_{20})$
and $$e_3 - e_4 = \Delta e \left(1 + \frac{R_{20}}{R_{24}}\right)$$

This circuit can reject the common mode by a factor $$A = \left(1 + \frac{R_{20}}{R_{24}}\right)$$

times better than the same amplifier in the usual circuit, wherein A is the amplification factor of the amplifier 10 and 11.

If for example $(R_{20}/R_{24}) = 100$, then the rejection is improved by 40 dB. If the operational amplifier 12 has a rejection of 60 dB in common mode, then a rejection of 100 dB is obtained with the pre-amplifier according to FIG. 2. In order to determine a path for the bias current, the input of the amplifier is connected to the ground over a low ohmic impedance through the resistors 22 and 23 and the voltage follower 13.

Besides a good common mode rejection, it is at least equally important to have high input impedances in differential mode as well as in common mode.

The impedance in common mode is especially important because the input voltages in common mode may be rather high in industrial arrangements. Input signals in common mode ($e_1 = e_2$) meet an apparently increased impedance at the input of the amplifier, since:

$$e_1 = e_2 = e_3 = e_4 = e_5 = e_6$$

$$i_1 = (e_1 - e_6/R_{22}) = 0$$

$$i_2 = (e_2 - e_6)/R_{23} = 0$$

In other words, the apparent impedances 22 and 23 are infinitely increased.

Figure 3:
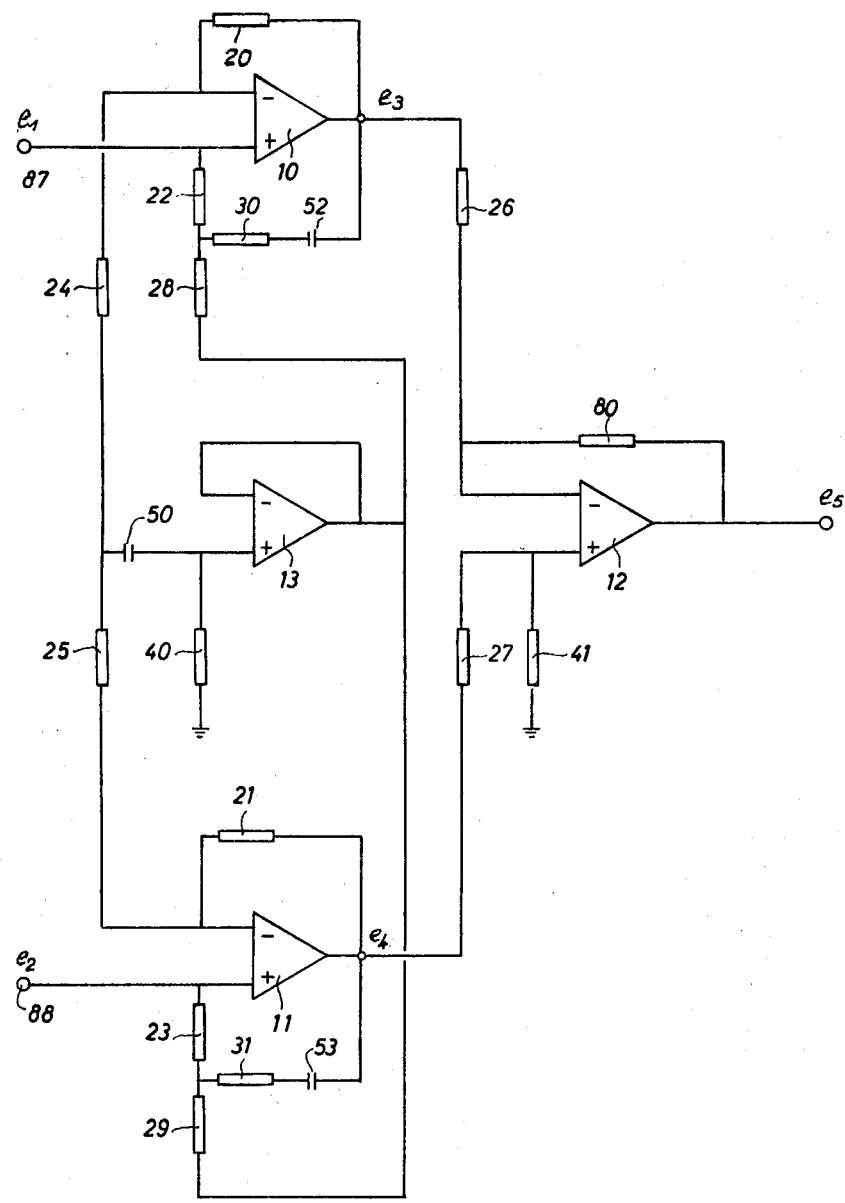
FIG. 3 is an embodiment of the pre-amplifier according to the invention.

A similar increase in impedance can be obtained for the differential input impedances, and this is the case in the circuit according to FIG. 3. In the circuit according to FIG. 2, the said impedance was mainly determined by the series connection of 22 and 23. According to the embodiment of FIG. 3, however, the resistors 22 and 23 are fed from the node of voltage dividers 30–28 and 31–29, which are fed at one side through capacitors 52 and 53 with the output voltage of the corresponding amplifiers 10 and 11, and at the other side with the output voltage of the voltage follower 13. When the division ratio of the resistors 28 and 30 is represented by:

$$A' = (R_{28} + R_{30})/R_{28}$$

then an alternating current $$i = e_1(1 - A'/A/R_{22})$$

is flowing through resistor 22.

Consequently, by an appropriate choice of the ratio A/A' the apparent resistance may be made to increase arbitrarily, and may even become negative.

When care has been taken that A' is somewhat greater than or equal to A, then the stability of the amplifier will never be disturbed since always the positive input impedance of the amplifier remains. In order to charge the measuring line of the measurement electrodes as little as possible, each shunt impedance must be avoided, and consequently also the impedance of the necessary shielding.

For this purpose, the two wires which lead from the measuring electrodes 87 and 88 to the pre-amplifier are each individually shielded, the shielding for the lead from the measuring electrode 87 to the amplifier 10 being fed from the node of the resistors 22 and 28, optionally through a resistor 32 (see FIG. 4) and the shielding for the lead from the measuring electrode 88 to the amplifier 11 is fed from the node of the resistors 23 and 29, optionally through a resistor 33. In this way the influence of the shunt capacity is reduced as much as the apparent resistance value of the resistor is increased. The resistors 32 and 33 assure the high-frequency stability of the circuit of FIG. 4. The capacitor 54 serves to prevent occasional oscillation and is selected in such a way that the bridge formed by the resistors 22 and 28, the divided capacity of the shielding, and the capacitor 54 is balanced.

Figure 4:
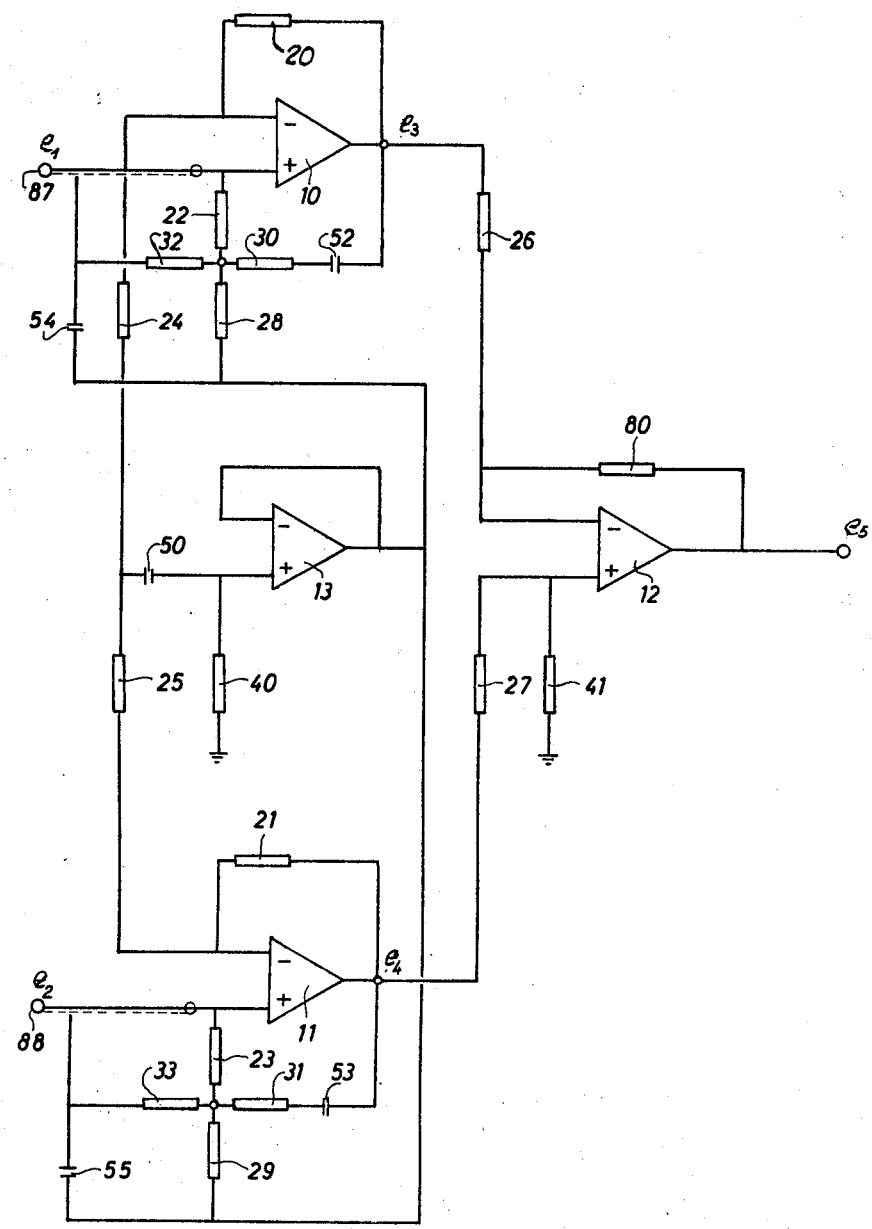
FIG. 4 is a further embodiment of the invention.

A practised embodiment of a pre-amplifier according to FIG. 4 met the following in the temperature range of 30° C ±20° C:

— amplification 1600 ±10 %, reproducibility better than 0.1 %
— phase error <1°
— input impedance for common mode voltage ≥ 300 MΩ
— input impedance for differential voltage ≥ 300 MΩ
— output alternating voltage $1mV_{eff}$/cm3/min ± 10 % at 50 Hz
— output direct voltage ≤ 100 mV
— rejection ratio of the common mode : better than 106 dB.

Figure 5:
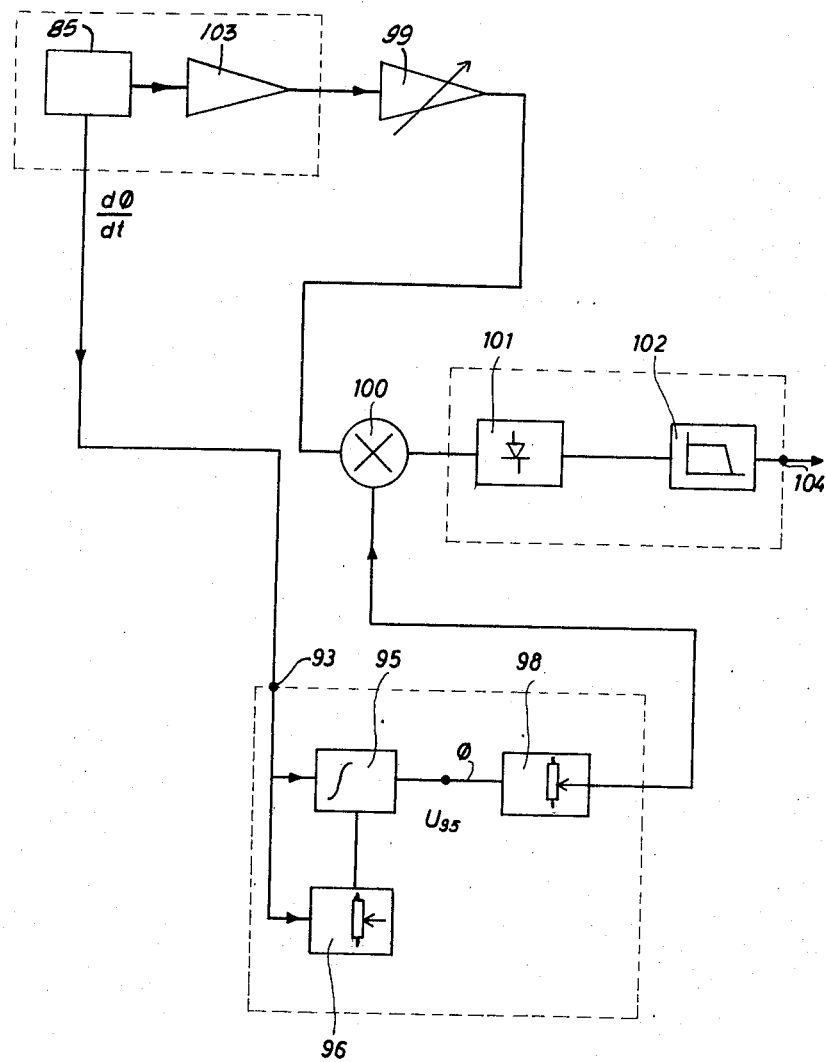
FIG. 5 shows a block diagram of a device for measuring the difference in rate of flow with respect to a set value.

FIG. 5 shows an electronic device for measuring the deviation of the rate of flow by means of the measuring device 85 according to FIG. 1, wherein use is made of the pre-amplifier 103 according to FIG. 4.

At 93 the measuring coil for the magnetic alternating field is connected with an integrator 95 and also with a potentiometer 96 which allows a phase correction to be made. The signal of the integrator 95 is further passed to a decade-potentiometer 98, by means of which the desired rate of flow (set point value) can be set. The output of potentiometer 98 is passed to a differential amplifier 100, together with the output of the pre-amplifier 103 according to the invention, which signal may be standardized and calibrated in part 99.

The operation of the device according to FIG. 5 can be explained as follows. The output of the pre-amplifier 103 is $U_{103} = S'.B.v_g$ wherein $S'$ is a constant value. By amplifying and integrating the output voltage 93 of the measuring coils, one obtains a value directly proportional to the alternating magnetic field : $U_{95} = K.B$ wherein $K$ is a factor of proportionality. With the decade-potentiometer 98 this factor of proportionality can be divided e.g. in such a way that $U_{98} = S'.v_s.B$ wherein $v_s =$ the desired value of the velocity (proportional to the rate of flow) and $S'.v_s = \alpha.K$ wherein $\alpha$ is the division factor of the potentiometer.

The signals $U_{103}$ and $U_{98}$ are subtracted from each other in the differential amplifier 100 so that $U_{100} = U_{103} - U_{98}$. This signal is synchronously detected in assembly 101 in order to eliminate error voltages which are shifted over 90° with respect to the measuring voltage.

The output signal of the synchronously operating detector is passed to a low pass filter 102. The output signal 104 of the device according to FIG. 5 represents the difference in the rate of flow with respect to the set point and can be used for the operation of a control valve for the liquid.

For measuring and recording, this signal can be used to control the servo-amplifier of a potentiometer recorder wherein the potentiometer of this latter instrument is used to replace the set point potentiometer 98.

In the same way, use can be made of an analog-digital converter with a forward-backward counter in order to obtain a directly readable indication of the flow by means of numerical display tubes.

The embodiments described above and illustrated in the drawings are, of course, susceptible of numerous modifications without departing from the spirit and scope of the present invention.

We claim:

1. In a magnetic flow meter for measuring the rate of flow of a liquid flowing through a conduit, wherein a magnetic alternating flux is generated almost normal to the direction of flow of the liquid through the conduit, and a voltage is measured over two measurement electrodes which are located on an axis almost normal to the direction of the flux and to the direction of the flow of the liquid, an electronic circuit which comprises a preamplifier with high common mode rejection ratio and high input impedance, comprising two identically connected operational amplifiers having different inputs, each feeding one of the differential inputs of a third operational amplifier, two identical impedances connected in series between the inverting inputs of the first two operational amplifiers, a fourth operational amplifier connected as a voltage follower with its input connected to the node of the said two impedances and its output connected through two pairs of series resistors to the corresponding non-inverting inputs of the two first mentioned operational amplifiers, the nodes of said pairs of series resistors being connected through further resistors to the output of the corresponding operational amplifiers, the input terminals of the pre-amplifier being formed by the said non-inverting inputs of the two first mentioned operational amplifiers and the output of the pre-amplifier being formed by the output of the third operational amplifier.

2. Magnetic flow meter according to claim 1, wherein the two electrodes are each connected to the input terminals of the pre-amplifier by a shielded lead, the shielding of each lead being connected to the corresponding node of the pairs of series resistors.

3. Magnetic flow meter according to claim 1, wherein means is provided for comparing the output signal of said pre-amplifier with a signal which is proportional to the magnetic flux which actually passes through the liquid between the two measurement electrodes.

4. Magnetic flow meter according to claim 3, wherein said proportional signal is generated by a measuring coil located close to the two said electrodes and connected to an integrator circuit.

5. Magnetic flow meter according to claim 3, wherein said means for comparing the output signal of the pre-amplifier with a signal which is proportional to the magnetic flux is a differential amplifier, the output of which is connected to a synchronous demodulator which eliminates voltages which are shifted over 90° with respect to the said magnetic flux.

* * * * *